(12) United States Patent
Chung

(10) Patent No.: US 10,001,196 B2
(45) Date of Patent: Jun. 19, 2018

(54) CONTINUOUSLY VARIABLE TRANSMISSION

(71) Applicant: Caleb Chung, Boise, ID (US)

(72) Inventor: Caleb Chung, Boise, ID (US)

(*) Notice: Subject to any disclaimer, the term of this patent is extended or adjusted under 35 U.S.C. 154(b) by 353 days.

(21) Appl. No.: 14/975,109

(22) Filed: Dec. 18, 2015

(65) Prior Publication Data

US 2016/0178033 A1    Jun. 23, 2016

Related U.S. Application Data

(60) Provisional application No. 62/094,645, filed on Dec. 19, 2014.

(51) Int. Cl.
| | | |
|---|---|---|
| *F16H 3/62* | (2006.01) | |
| *F16H 3/72* | (2006.01) | |
| *F16H 37/10* | (2006.01) | |
| *F16H 3/74* | (2006.01) | |

(52) U.S. Cl.
CPC ............... *F16H 3/62* (2013.01); *F16H 3/721* (2013.01); *F16H 3/74* (2013.01); *F16H 37/10* (2013.01)

(58) Field of Classification Search
None
See application file for complete search history.

(56) References Cited

U.S. PATENT DOCUMENTS

| | | | |
|---|---|---|---|
| 1,887,705 A | 11/1932 | Worrall | |
| 2,584,799 A | 2/1952 | Green | |
| 3,241,400 A | 3/1966 | Pablo | |
| 3,242,769 A * | 3/1966 | Johnson | ................. F16H 3/721 475/218 |
| 3,318,172 A | 5/1967 | Cummins | |
| 3,861,240 A * | 1/1975 | Nolan | ..................... F16H 37/10 475/81 |
| 4,191,070 A | 3/1980 | McKinniss | |

(Continued)

FOREIGN PATENT DOCUMENTS

| | | |
|---|---|---|
| DE | 19530245 A1 | 2/1997 |
| GB | 473677 A | 10/1937 |

(Continued)

OTHER PUBLICATIONS

U.S. International Searching Authority; International Search Report & Written Opinion issued in PCT Patent Application No. PCT/US2015/066944 dated Feb. 23, 2016.

(Continued)

*Primary Examiner* — Derek D Knight
(74) *Attorney, Agent, or Firm* — Parsons Behle & Latimer

(57) ABSTRACT

A continuously variable transmission includes a first asymmetrical differential, having a transmission input shaft and a first output shaft, aligned along a transmission axis, a second asymmetrical differential, having a transmission output shaft and a first input shaft, aligned along the transmission axis, and a reduction gear unit, coupled between the first output shaft of the first asymmetrical differential and the first input shaft of the second asymmetrical differential. Rotation of the input shaft at a first input speed and torque is converted into rotation of the transmission output shaft at a second output speed and torque that varies independently of the first input speed and torque in response to a rotational resistance on the transmission output shaft.

23 Claims, 14 Drawing Sheets

(56) References Cited

U.S. PATENT DOCUMENTS

| | | | |
|---|---|---|---|
| 4,235,125 A | | 11/1980 | Perlin |
| 4,334,440 A | | 6/1982 | Fonck |
| 4,718,297 A | * | 1/1988 | Hawkins ............... F16H 37/10 475/6 |
| 4,784,017 A | | 11/1988 | Johnshoy |
| 4,805,488 A | | 2/1989 | Sherman |
| 5,456,640 A | | 10/1995 | Petersen |
| 5,662,009 A | * | 9/1997 | Palmer ................ B25B 13/461 475/221 |
| 5,910,060 A | * | 6/1999 | Blume ................. B60K 17/04 475/221 |
| 6,213,908 B1 | * | 4/2001 | Hsiao .................... F16H 3/74 475/221 |
| 6,605,017 B1 | | 8/2003 | Comic |
| 7,384,362 B2 | * | 6/2008 | Jo ......................... F16H 3/74 475/219 |
| 7,568,992 B1 | | 8/2009 | Sierra |
| 8,246,502 B2 | * | 8/2012 | Esplin ................... F16H 3/722 475/221 |
| 2007/0155576 A1 | | 7/2007 | Shapiro |
| 2010/0275712 A1 | | 11/2010 | Economou |

FOREIGN PATENT DOCUMENTS

| | | |
|---|---|---|
| GB | 2219640 A | 12/1989 |
| JP | 09100883 | 4/1997 |
| KR | 2002063343 | 8/2002 |
| WO | WO2007046722 | 4/2007 |

OTHER PUBLICATIONS

European Patent Office; Extended European Search Report for Application No. 15871258.8 dated Dec. 20, 2017.

\* cited by examiner

CONTINUOUSLY VARIABLE TRANSMISSION

PRIORITY CLAIM

The present application claims the benefit of U.S. Provisional Patent Application Ser. No. 62/094,645, filed on Dec. 19, 2014, and entitled CONTINUOUSLY VARIABLE TRANSMISSION, the disclosure of which is incorporated herein by reference in its entirety.

FIELD OF THE DISCLOSURE

The present application relates to mechanical transmissions. More particularly, the present disclosure provides a continuously variable transmission that passively senses and automatically adjusts to changes in loads, and provides the high torque advantages of mechanical gears.

BACKGROUND

Machines that are powered by an engine, such as motor vehicles, typically include a transmission to adjust the rotational speed and torque between the engine and the machine. Some engines, such as internal combustion engines, typically operate at higher rotational speeds (except when operating in an overdrive condition, for example) than are desired as output for their associated machine. On the other hand, some engines, such as electric motors, may typically operate at lower rotational speeds than are desired for their associated machine. However, various types of engines will have characteristic operating range(s) that is/are considered most desirable in terms of operational speed, torque, power output, and for the mechanical health and longevity of the engine. Accordingly, a mechanical transmission is typically provided between an engine and its associated machine so that a drive ratio between the engine output and the machine output can be varied over a desired operating range of the engine. Such transmissions typically include a power train of multiple gears of varying diameters and gear ratios that can be shifted between different gear combinations, to provide a desired output rotational speed for the machine that varies from the engine operating speed, in various power and torque conditions. This allows the machine be operated closer to its desired operating torque and speed range while permitting the output to vary over different and usually broader torque and speed ranges.

In automobiles, for example, manual transmissions were developed to allow a user to manually select one of several discrete gear ratios. Automatic transmissions were later developed in which an appropriate gear ratio for given conditions and power demand are automatically determined and implemented. Conventional transmissions, whether manual or automatic, are often complicated, heavy, and bulky, and therefore expensive. Further, such systems often shift abruptly in a stepped manner between discrete ratios, rather than in a smooth and continuous manner. These characteristics of conventional transmissions tend to reduce the overall efficiency of the machine, and also introduce operational characteristics that are considered undesirable.

These characteristics become particularly noticeable in other transmission applications. For example, farm equipment typically operates within a relatively narrow range of speeds. However, a tractor, for example, may have another piece of farm equipment connected to a power take-off (PTO). The additional piece of farm equipment may be preferably operated at a nearly constant operational speed, thus involving a relatively large number of gear ratios to drive the tractor at varying speeds while maintaining the engine at a nearly constant rotational speed for the sake of the PTO.

To address some of these issues related to mechanical transmissions, continuously variable transmissions have been developed. Continuously variable transmissions select and provide output power along a continuously variable range of gear ratios, rather than in discrete steps, thus allowing more optimum and continuous operation of the engine. However, conventional continuously variable transmissions typically employ belt and pulley systems or frictional cones and the like, which rely upon friction for operation. They can also be relatively mechanically complicated. Consequently, known continuously variable transmissions tend to present significant mechanical losses, which reduces their efficiency, and are also limited in the maximum torque which they can transfer, thus limiting their use to relatively low torque applications (e.g. small motor vehicles). Other concerns also exist with conventional manual, automatic and continuously variable transmissions.

The present application is directed to overcoming one or more of the above-mentioned issues.

SUMMARY

It has been recognized that it would be desirable to have a continuously variable transmission that has relatively low mechanical losses.

It has also been recognized that it would be desirable to have a continuously variable transmission that can be scaled up to high torque applications.

It has also been recognized that it would be desirable to have a continuously variable transmission that is relatively mechanically simple.

In accordance with one aspect thereof, the present disclosure provides a continuously variable transmission, including a first asymmetrical differential, having a transmission input shaft and a first output shaft, aligned along a transmission axis, a second asymmetrical differential, having a transmission output shaft and a first input shaft, aligned along the transmission axis, and a reduction gear unit, coupled between the first output shaft of the first asymmetrical differential and the first input shaft of the second asymmetrical differential. Rotation of the input shaft at a first input speed and torque is converted into rotation of the transmission output shaft at a second output speed and torque that varies independently of the first input speed and torque in response to a rotational resistance on the transmission output shaft.

In accordance with another aspect thereof, the present disclosure provides a continuously variable transmission, including a first asymmetrical differential, a second asymmetrical differential, and a reduction gear unit, having a gear ratio, disposed between the first and second asymmetrical differentials. The first asymmetrical differential has an input shaft configured for connection to an output shaft of a motor, and a coaxial pair of first output shafts, including an outer output shaft and an inner output shaft. The input shaft and the output shafts are disposed along a common transmission axis. The second asymmetrical differential has an output shaft, and a coaxial pair of input shafts, including an outer input shaft and an inner input shaft. The output shaft and the input shafts being disposed along the transmission axis, and the inner input shaft is an extension of the inner output shaft. The reduction gear unit has a reduction gear input coupled to the outer output shaft, and a reduction gear output coupled to the outer input shaft, whereby rotation of the input shaft of the first asymmetrical differential at a first input speed and torque is converted into rotation of the output shaft at a second output speed and torque that varies independently of the first input speed and torque in direct response to rotational resistance on the output shaft.

In accordance with yet another aspect thereof, the present disclosure provides a continuously variable drive system, including a motor, having a drive shaft, and a transmission output shaft, disposed along a transmission axis. A first asymmetrical differential has an input shaft coupled to the drive shaft, and first and second coaxial output shafts, disposed along the transmission axis. A reduction gear has an input coupled to the first output shaft of the first asymmetrical differential, and an output. A second asymmetrical differential has a first input shaft coupled to the output of the reduction gear, and a second input shaft coupled to the second output shaft of the first asymmetrical differential, disposed along the transmission axis. A speed and torque of the transmission output shaft varies independently of a speed and torque of the drive shaft in direct response to rotational resistance on the transmission output shaft.

Figure 1:
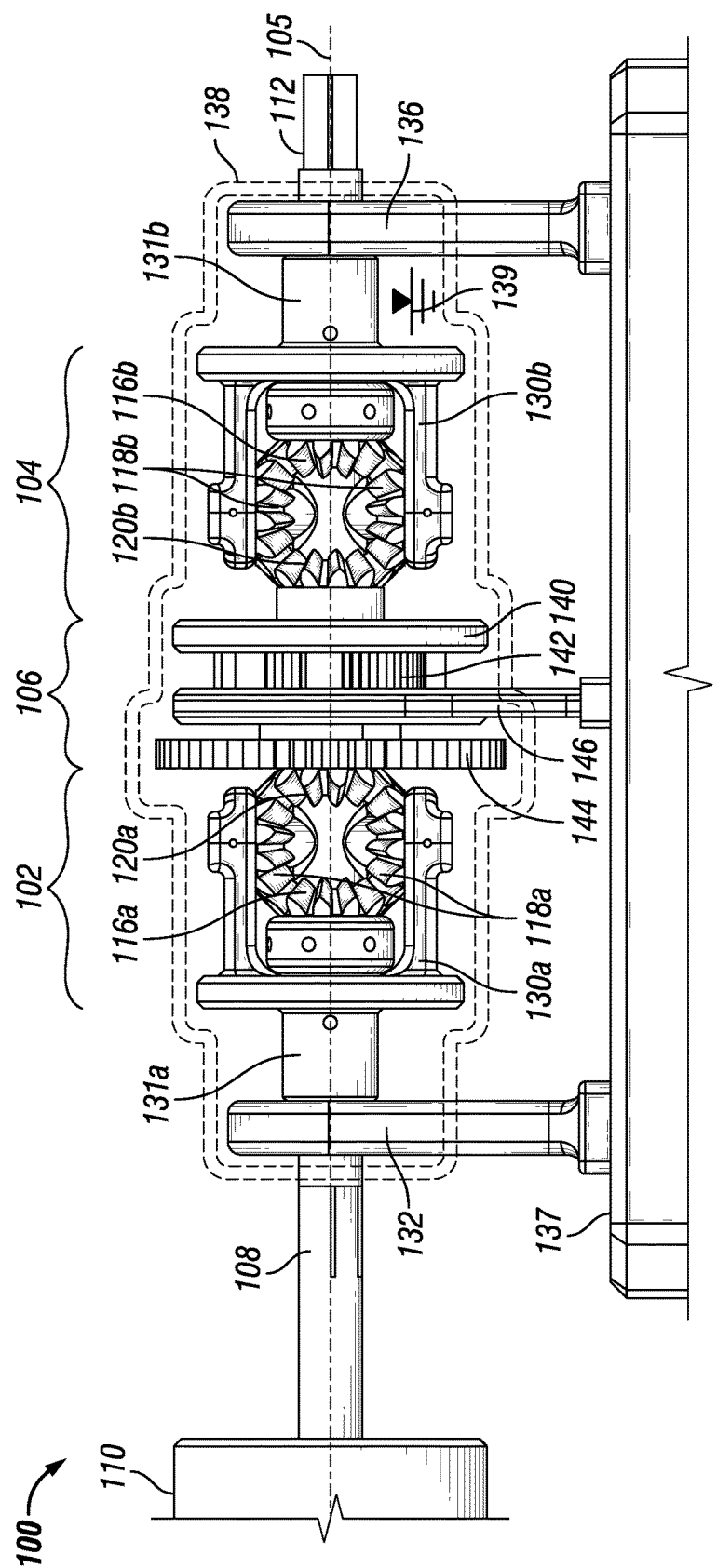
FIG. 1 is a side view of one embodiment of a continuously variable transmission in accordance with the present disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

As noted above, continuously variable transmissions that are currently known generally include belts and pulleys, frictionally engaged cones, or other systems that rely on friction and are limited in their torque capacity. Additionally, these transmissions often involve relatively complicated control schemes so that torque and speed on input and output are properly adjusted for different conditions.

Advantageously, the present disclosure provides a continuously variable transmission that automatically changes speed and torque in response to varying loads applied to the output shaft. Also, because this transmission uses gears to transmit rotational force, rather than belts or cones or other friction-based schemes, it experiences very small power losses, and is scalable to very high torque applications.

Figure 2:
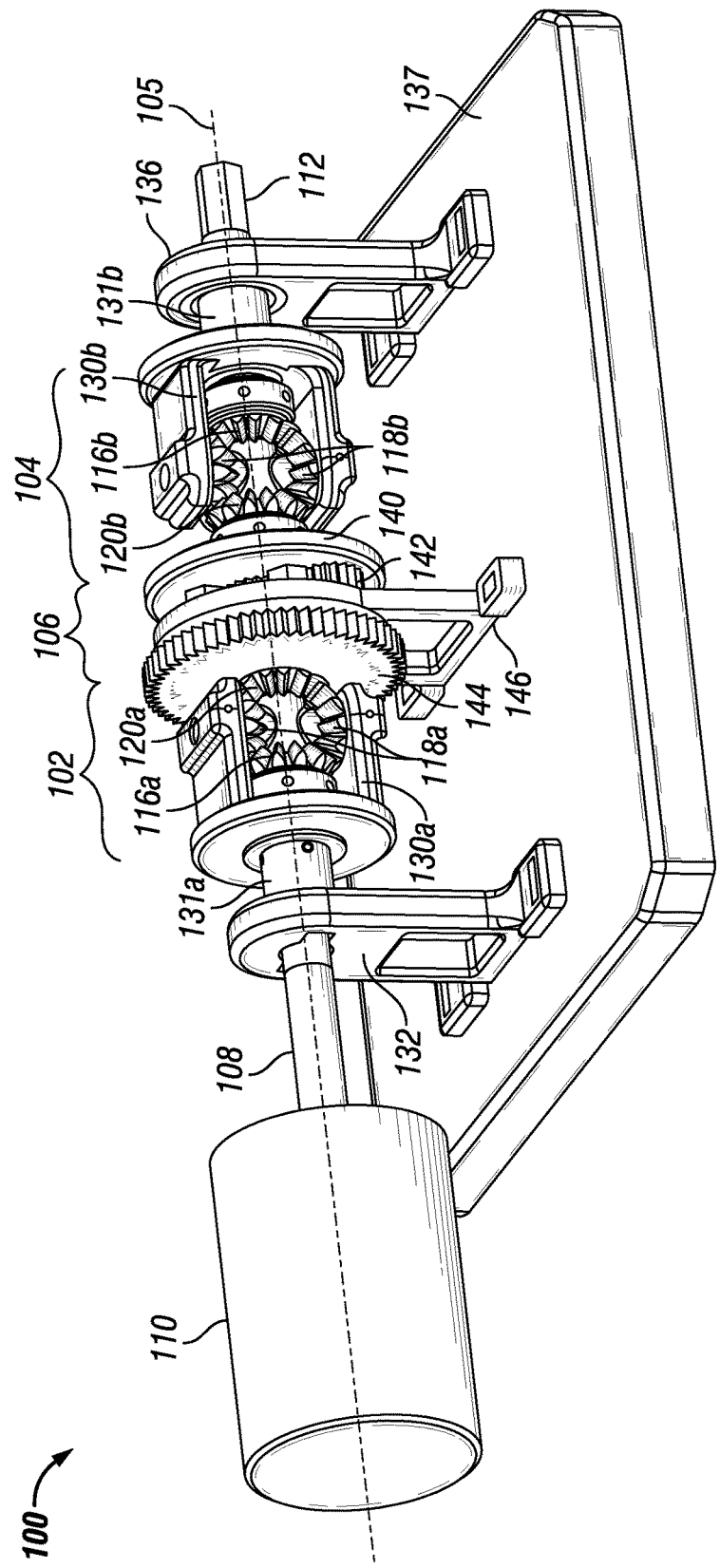
FIG. 2 is perspective view of the continuously variable transmission of FIG. 1.
Figure 3:
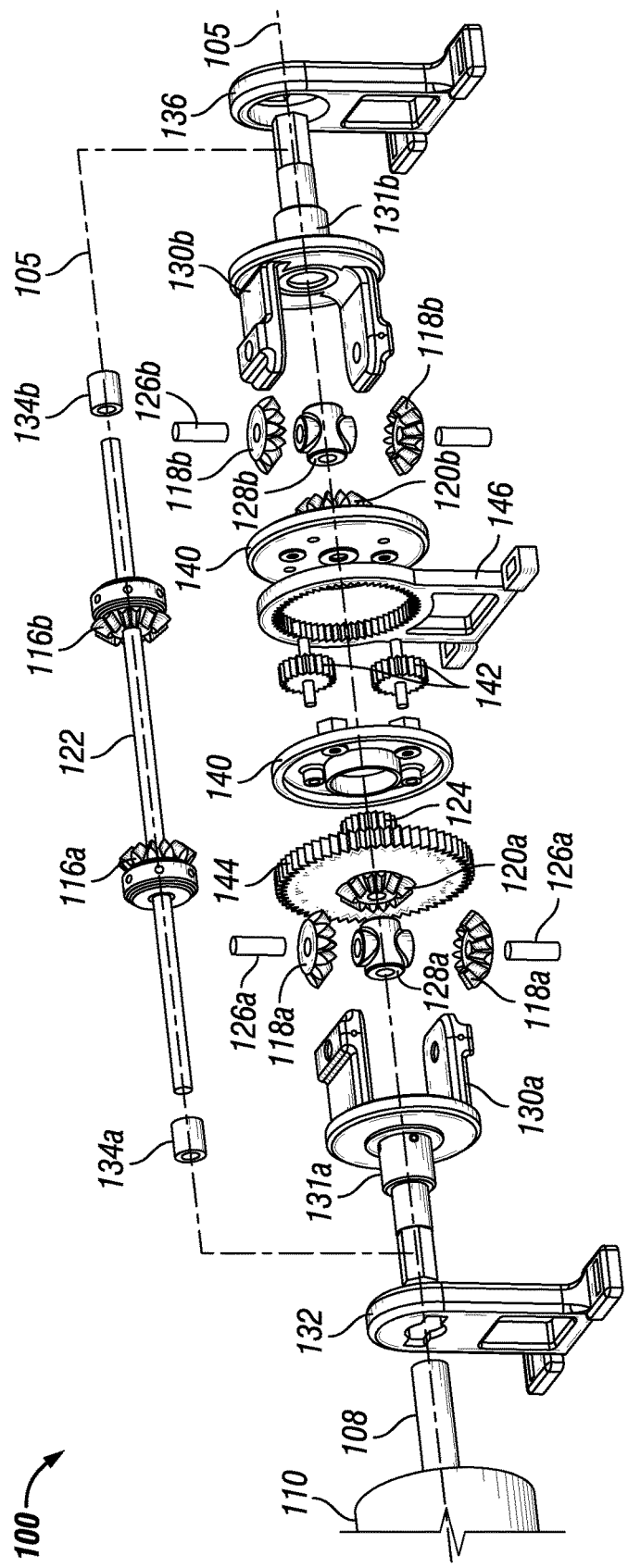
FIG. 3 is an exploded perspective view showing the components parts of the continuously variable transmission of FIG. 1.
Figure 4:
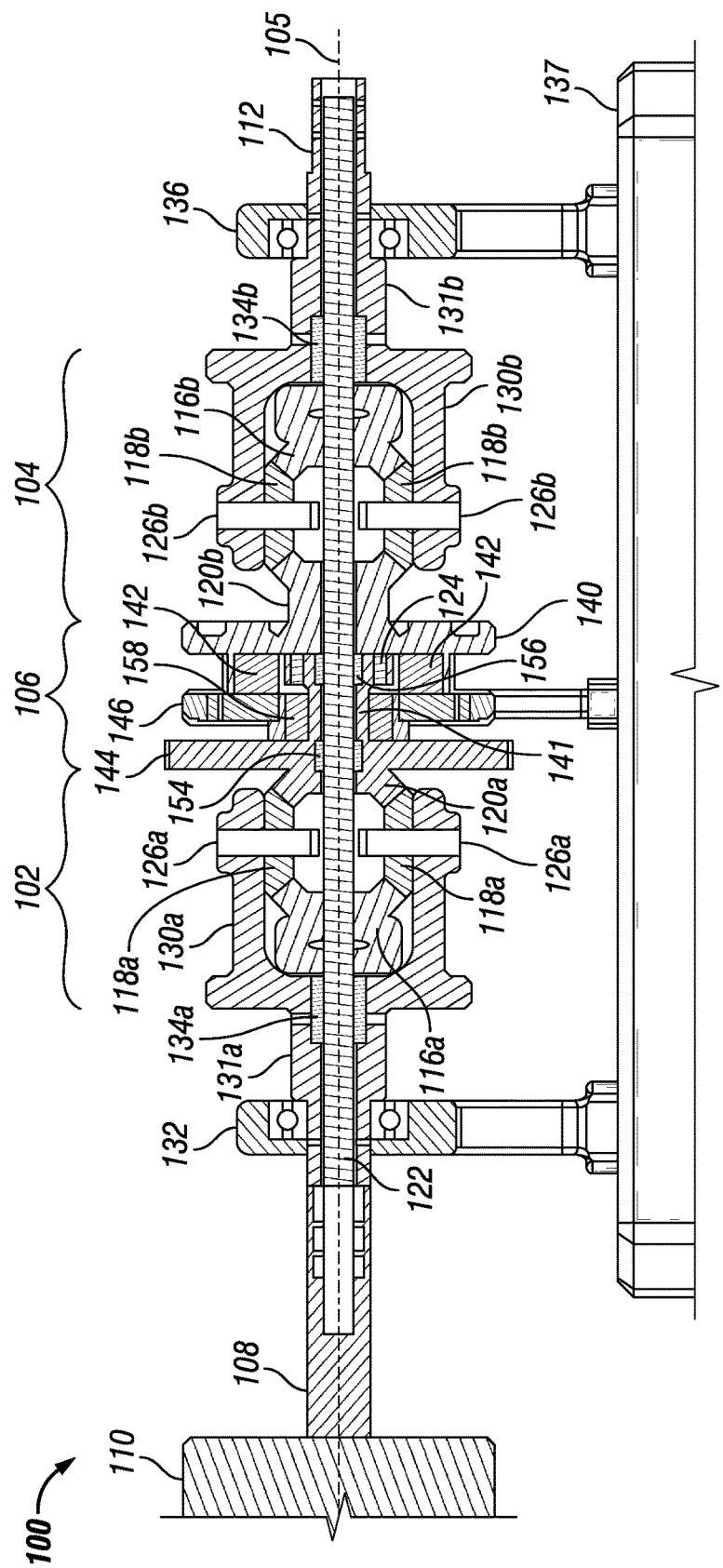
FIG. 4 is a side, cross-sectional view of the continuously variable transmission of FIG. 1.

Shown in FIGS. 1 and 2 are side and perspective views of one embodiment of a continuously variable transmission 100 in accordance with the present disclosure. An exploded view is shown in FIG. 3, and a side, cross-sectional view is shown in FIG. 4. With reference to FIGS. 1-4, a continuously variable transmission 100 in accordance with the present disclosure generally includes a first asymmetrical differential 102 and a second asymmetrical differential 104 that are linearly aligned along a common transmission axis, indicated at 105, with a reduction gear assembly 106 disposed between them. The first asymmetrical differential 102 is coupled to an input shaft or drive shaft 108 from a motor 110 or other mechanical device that provides a rotational driving force, and the second asymmetrical differential 104 is coupled to an output shaft 112, which transmits rotational force to some output device, such as a drive wheel (not shown) of a motor vehicle, for example.

Figure 7A:
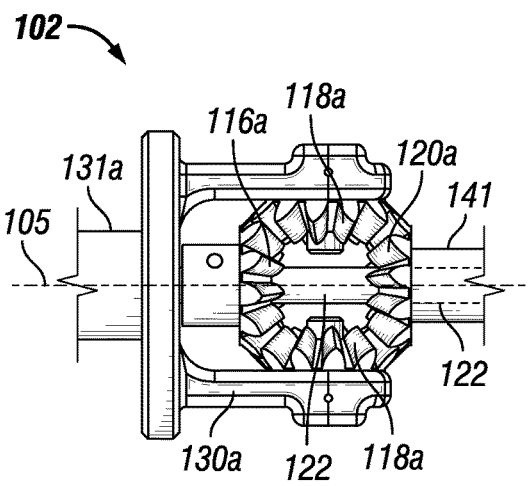
FIG. 7A is a side view of an asymmetrical differential as disclosed herein.
Figure 7B:
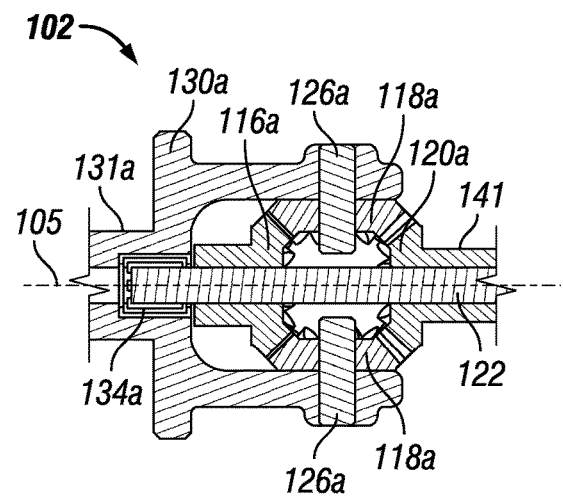
FIG. 7B is a cross-sectional view of the asymmetrical differential of FIG. 7A.
Figure 8:
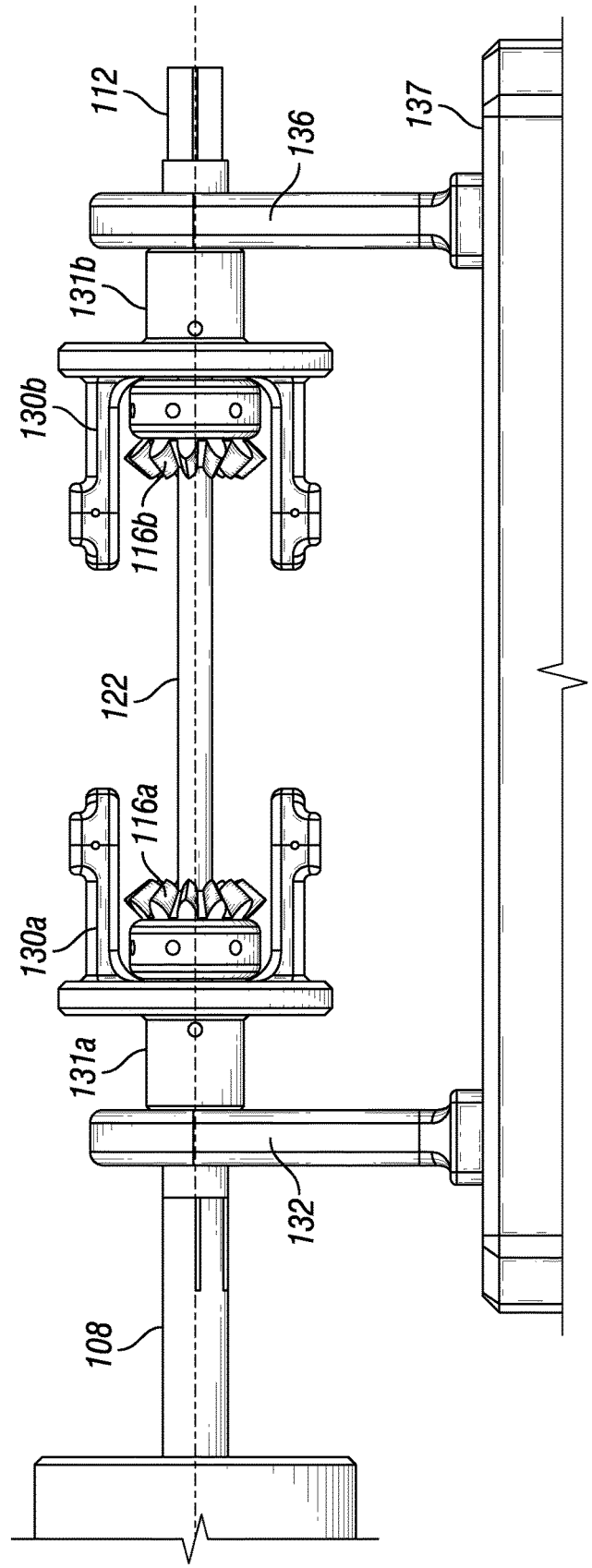
FIG. 8 is a side view of the continuously variable transmission of FIG. 1, partially disassembled to show the high speed/low torque shaft and its bevel gears.
Figure 9:
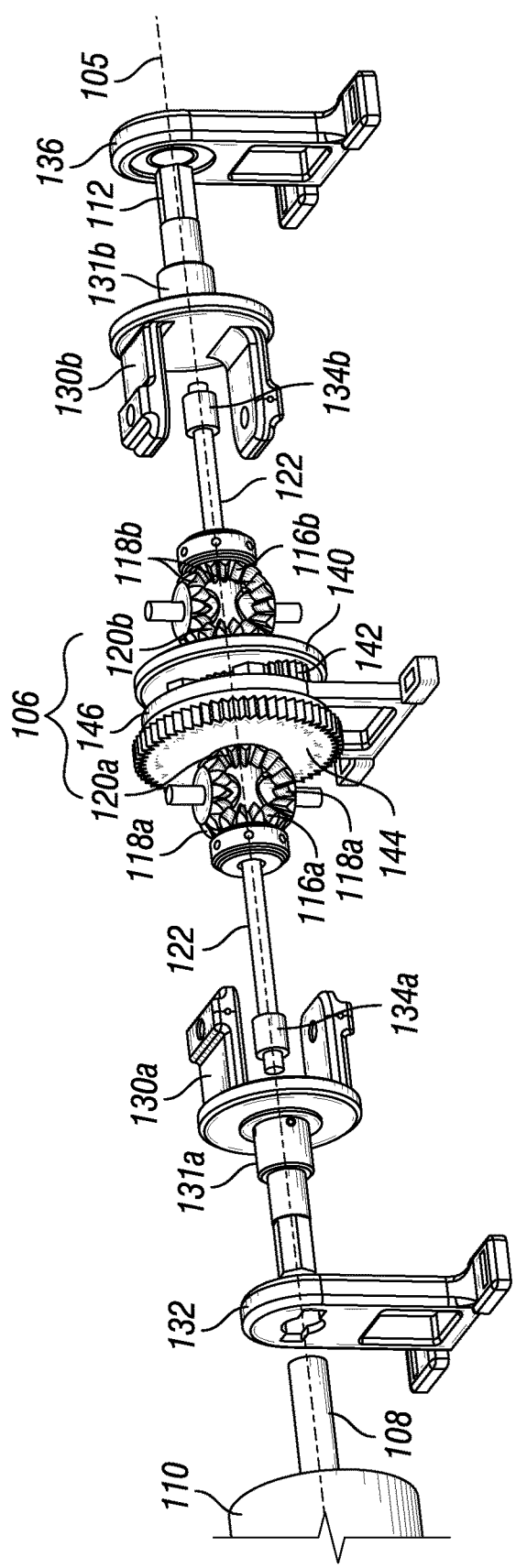
FIG. 9 is a perspective view of the continuously variable transmission of FIG. 1, partially disassembled to show the reduction gear unit.

The first asymmetrical differential 102 includes a first set of gears, including a high speed low torque bevel gear 116a, a pair of opposing first differential bevel gears 118a, and a low speed high torque bevel gear 120a. The high speed low torque bevel gear 116a and the low speed high torque bevel gear 120a are both intermeshed with the first differential bevel gears 118a, but at opposite positions. The high speed low torque bevel gear 116a is fixedly attached to a proximal end of a high speed shaft 122, which is best seen in FIGS. 3-5. The low speed high torque bevel gear 120a is fixedly attached to the sun gear 124 of the reduction gear unit 106, as best seen in FIGS. 6-8. Viewing FIGS. 3 and 4, the first differential gears 118a, are disposed on differential gear axle shafts 126a, which are attached to a first differential gear hub 128a and a first armature 130a of the first differential 102.

Referring again to FIGS. 1, 3 and 4, the first armature 130a includes a shaft extension 131a that is fixedly attached to the input shaft 108, and is supported by an input shaft bearing 132. The proximal end of the high speed shaft 122 is not affixed to the input shaft 108, but is rotationally supported upon its own high speed shaft proximal bearing 134a, which is disposed within the first armature 130a. The high speed shaft 122 can thus rotate at a speed that is independent of the speed of rotation of the input shaft 108 and the first armature 130a. The high speed shaft 122 passes through openings in the differential gear hub 128a, the low speed high torque bevel gear 120a, and the reduction gear unit 106, as described in more detail below with reference to FIGS. 3 and 4. Its rotational speed is thus also independent of these other structures.

The second asymmetrical differential 104 is essentially a mirror image of the first asymmetrical differential 102. As shown in FIGS. 1, 3 and 4, the second differential 104 includes a second set of gears, which include a second high speed low torque bevel gear 116b, a pair of second differential bevel gears 118b, and a second low speed high torque bevel gear 120b. The second differential gears 118b, are disposed on differential gear axle shafts 126b, which are attached to a second differential gear hub 128b and a second armature 130b of the second differential 104. The high speed shaft 122 passes through openings in the second differential gear hub 128b, the second low speed high torque bevel gear 120b, and the reduction gear unit 106, as can be best seen with reference to FIGS. 3 and 4.

The second high speed low torque bevel gear 116b and the second low speed high torque bevel gear 120b are both intermeshed with the second differential bevel gears 118b, but at opposite positions. The second high speed low torque bevel gear 116b is fixedly attached at a distal end of the high speed shaft 122, and thus rotates at the same speed as the first high speed low torque bevel gear 116a, as can be appreciated by viewing FIGS. 3-5. The second low speed high torque bevel gear 120b is fixedly attached to the carrier 140 of the reduction gear unit 106, as best seen in FIGS. 6-8 and 10-12.

Referring again to FIGS. 1, 3 and 4, the second armature 130b includes a shaft extension 131b that is fixedly attached to the output shaft 112, and is supported by an output shaft bearing 136. The distal end of the high speed shaft 122 is not fixedly connected to the second armature 130b or to the output shaft 112, but is supported upon its own high speed output shaft bearing 134b, which is rotationally disposed within the second armature 130b. As noted above, this configuration allows the rotational speed of the high speed shaft 122 to be independent of the second armature 130b and other structures of the continuously variable transmission 100, including the reduction gear unit 106.

In FIGS. 1, 2 and 4 the bearings 132, 136 are shown supported on a base 137, but this is for demonstration purposes only. In use, it is anticipated that the transmission 100 will be enclosed within a housing 138, shown in dashed lines in FIG. 1. This housing 138 can enclose the first and second asymmetrical differentials 102, 104, the reduction gear 106, and other components, as shown. The transmission housing 138 can be sealed in the same way vehicle differential housings are commonly sealed, with a lubricant such as oil permanently disposed inside, as indicated by the fluid surface 139, shown in FIG. 1.

Figure 5A:
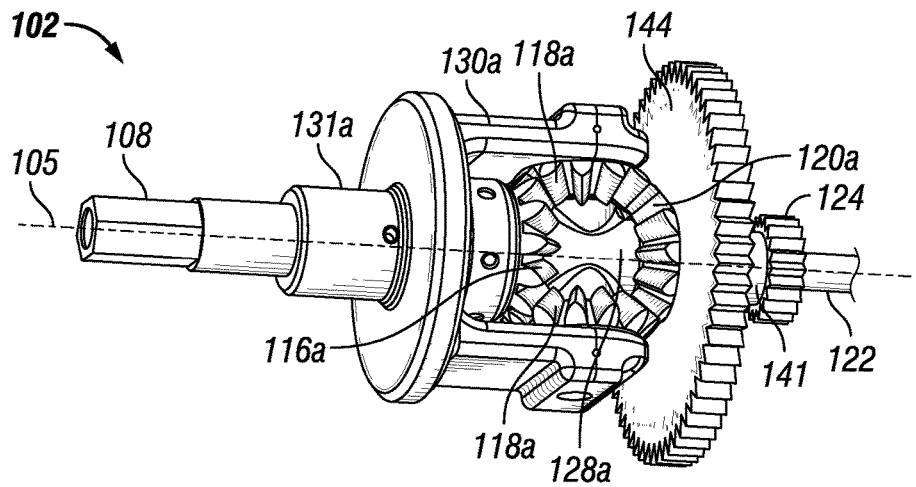
FIG. 5A is a perspective view of an asymmetrical differential.
Figure 5B:
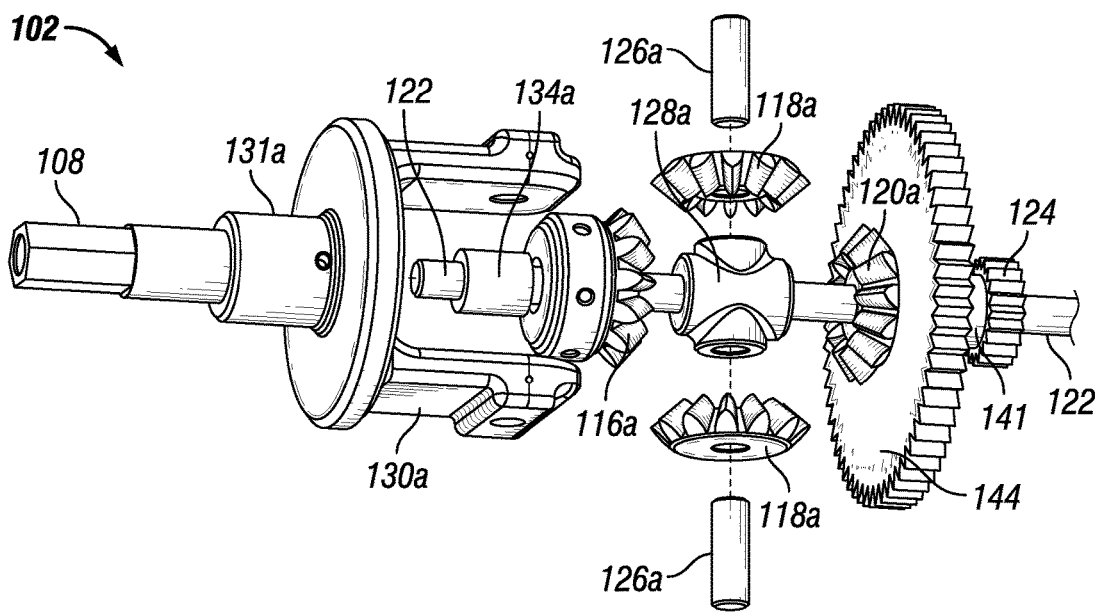
FIG. 5B is an exploded perspective view of the asymmetrical differential of FIG. 5A.
Figure 6A:
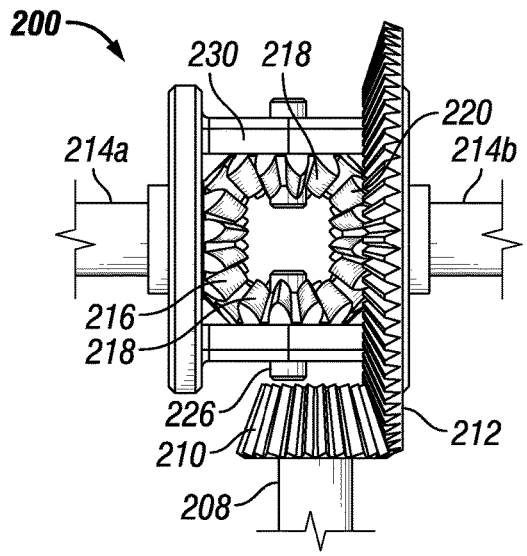
FIG. 6A is a side view of a conventional limited slip differential.
Figure 6B:
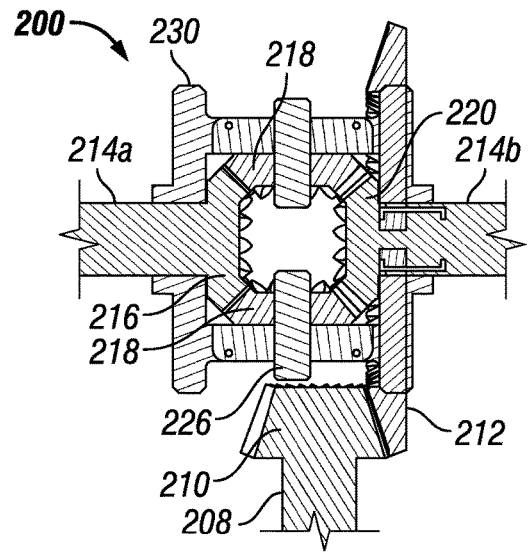
FIG. 6B is a cross-sectional view of the conventional differential of FIG. 6A.

As used herein, the term "asymmetrical differential" has reference to a gear differential in which a single rotational input (e.g. input shaft or drive shaft) enters one side of the device, and two coaxial output shafts (one smaller shaft disposed inside a larger hollow shaft) exit on a different, common side. Shown in FIG. 5A is a perspective view of an asymmetrical differential 102 like this, and FIG. 5B provides an exploded perspective view of the same device. The asymmetrical differential 102 is similar in function to gear differentials that are commonly used in automobiles and other machines to transmit torque from a drive shaft to a pair of drive wheels, but is different in arrangement. Shown in FIG. 6A is a side view of a conventional limited-slip differential 200, and FIG. 6B provides a cross-sectional view of the same. In this type of common differential, a drive shaft 208 enters a first side of the differential 200, and a pair of drive axles 214a, 214b exit on opposing lateral sides (e.g. left and right) of the unit, extending to respective drive wheels (not shown). A pinion gear 210 is attached to the drive shaft 208, and drives a crown wheel 212, which rotates about an axis that is aligned with the axis of the drive axles 214, and perpendicular to the axis of the drive shaft 208.

Within the differential 200, a pair of differential bevel gears 218 are attached to a rotating armature 230. The armature 230 is fixedly attached to the crown wheel 212, and rotates with it. The differential bevel gears 218 are intermeshed with drive gears 216 and 220, which are connected to the respective axles 214a, b. The axles, however, are not connected to the crown wheel 212 or the armature 230. Consequently, the differential bevel gears 218 transmit torque from the drive shaft 208 to the drive axles 214, and can allow a different degree of torque and speed to flow to the respective axles 214 if one of them encounters more resistance than the other. For example, when an automobile traverses a sharply curved path, a drive wheel that is on the inside of the curve follows a shorter path, while the outer drive wheel experiences a longer path. If both drive wheels were driven with the same torque and speed, one of them would tend to slip. With the differential 200 of FIGS. 6A, 6B, on the other hand, the axles 214a, b can rotate at different rates. If one of the axles 214 experiences more resistance to motion, that resistance with be mechanically transmitted into the differential 200 through the respective drive gear 216, 220. Specifically, where the rotational speed of the armature 230 does not change, rotational resistance by one of the drive gears 216, 220 will cause the differential bevel gears 218 to rotate faster and thus transmit a higher speed of rotation to the opposite drive gear. The differential 200 thus provides two outputs (axles 214a, b) that can have different rotational speeds, depending on the resistance that each experiences. In the differential of FIGS. 6A, B, if one axle 214 were completely stopped, and prevented from rotation, all torque from the drive shaft 208 would be transmitted to the other axle 214.

The asymmetrical differential 102 disclosed herein likewise provides two outputs that can have different rotational torque and speed, depending on the resistance that each experiences, but these output shafts exit the device on the same side, and are aligned with the input shaft. Shown in FIG. 7 is. With reference to FIGS. 3-5 and FIGS. 7A and 7B, which show close-up side and cross-sectional views of an asymmetrical differential as disclosed herein, it can be seen that the input shaft 108 is fixedly connected to the shaft extension 131a, which is fixedly connected to the armature 130a. Attached to the armature 130a by bearing shafts 126a are a first pair of differential bevel gears 118a, which intermesh with the high speed low torque bevel gear 116a and the low speed high torque bevel gear 120a. The high speed low torque bevel gear 116a is fixedly connected to the high speed shaft 122, which passes through the hub 128a and through the low speed high torque bevel gear 120a. The low speed high torque bevel gear 120a is fixedly attached to a hollow shaft output structure, which in this embodiment is the planet gear 124 for the reduction gear unit 106. The high speed shaft 122 thus extends through the hollow of the planet gear 124. The rotational input via the input shaft 108 is thus transmitted to two coaxial output shafts 122, 124, which are all aligned along the transmission axis 105.

Thus, instead of drive axles or shafts exiting the differential on the left and the right to opposing axles, as in FIGS. 6A, B, both driven axles 122 and 141 exit the differential 102 on same side. The high speed center shaft 122 rotates with the high speed bevel gear 116a, and is the functional equivalent of a first one of the drive gears (e.g. 218) in FIGS. 6A, 6B, while the low speed high torque shaft extension 141 is the functional equivalent of the second one of the drive gears (e.g. 220) in FIGS. 6A, 6B. This is possible because the high torque shat extension 141 is a hollow tube that the low torque shaft 122 passes through. Thus, both output axles 122, 141 extend toward a single side, where they are connected to the corresponding shafts of the second differential 104 and the reduction gear 106, respectively.

Advantageously, the second differential 104 is also an asymmetrical differential, and is configured as a mirror image of the first asymmetrical differential. By using two asymmetrical differentials, the force of the motor (110 in FIG. 1) is divided into two different outputs by the first asymmetrical differential 102, each output having an independent torque and speed. One of these outputs (the high torque extension 141) is attached to the reducing gearbox 106, then recombined with the other output (the high speed shaft 122) via the second asymmetrical differential 104. The result is a single output shaft 112 that automatically and naturally responds to changes in loads applied to it, because of the reduction gear 106, as described more fully below.

The reduction gear unit 106, which is disposed between the first differential 102 and the second differential 104, is best shown in FIGS. 3 and 10-12. It is to be understood that, while the reduction gear 106 unit shown and described herein is a planetary reduction gear, other types of reduction gear systems can also be used. For example, it is believed that a non-planetary compound gear system or a worm drive reduction gear could also arranged to be used in this application. It will also be appreciated that the gear ratio of the reduction gear unit 106 can vary. In one embodiment, an approximate gear ratio of 3:1 has been used. However those of skill in the art will appreciate that this type of continuously variable transmission can be constructed with other gear ratios. Any gear ratio can be selected and embodied in a single reduction gear unit 106, though the size of the reduction gear unit 106 will be affected by this choice. A higher gear ratio can be used in applications where a greater range of torque loads are anticipated. For example, where this transmission is used with vehicles that are designed for off-road use or to carry heavy loads, such as trucks and the like, the transmission 100 can have a reduction gear unit 106 with a higher gear ratio (e.g. 10:1). The maximum gear ratio (and lowest speed) will naturally engage only when the highest torque demands are applied. When the load is lighter, a lower gear ratio will naturally operate, thus allowing higher speeds if desired.

It is also to be appreciated that multiple reduction gear units 106 can be attached in series between the first differential 102 and the second differential 104, to provide a very high gear ratio, if desired. Where multiple reduction gear units are attached in series—i.e. the output shafts of adjacent reduction gear units are attached to the input shaft (i.e. sun gear) of the next reduction gear—the gear ratio can be multiplied. For example, two 3:1 reduction gear units attached in series will provide a gear reduction of 9:1. Accordingly, three reduction gear units connected in series, each having a reduction ratio of 10:1, will provide an overall gear reduction of 1,000:1, for example. It is to be understood that these possible gear ratios and configurations are merely examples. A reduction gear unit or group of reduction gear units can be configured to provide any desired gear ratio.

It is also to be appreciated that the orientation of the reduction gear can be reversed, so that instead of a ratio of 3:1, for example, the ratio becomes 1:3, and the term "reduction gear," as used herein, is intended to refer to a device that provides a gear ratio in either direction, whether upward or downward relative to the input shaft. A gear ratio in this direction may be desirable for coupling of the transmission 100 to an internal combustion engine, for example, in which the normal operating speed of the engine is relatively high compared to the desired speed of the output shaft. Again, multiple sequential reduction gear units having this sort of orientation can be used to provide a very high gear ratio. Using the example given above, where three reduction gear units are connected in series, each having a reduction ratio of 1:10, this will provide an overall gear reduction of 1:1,000.

Figure 10:
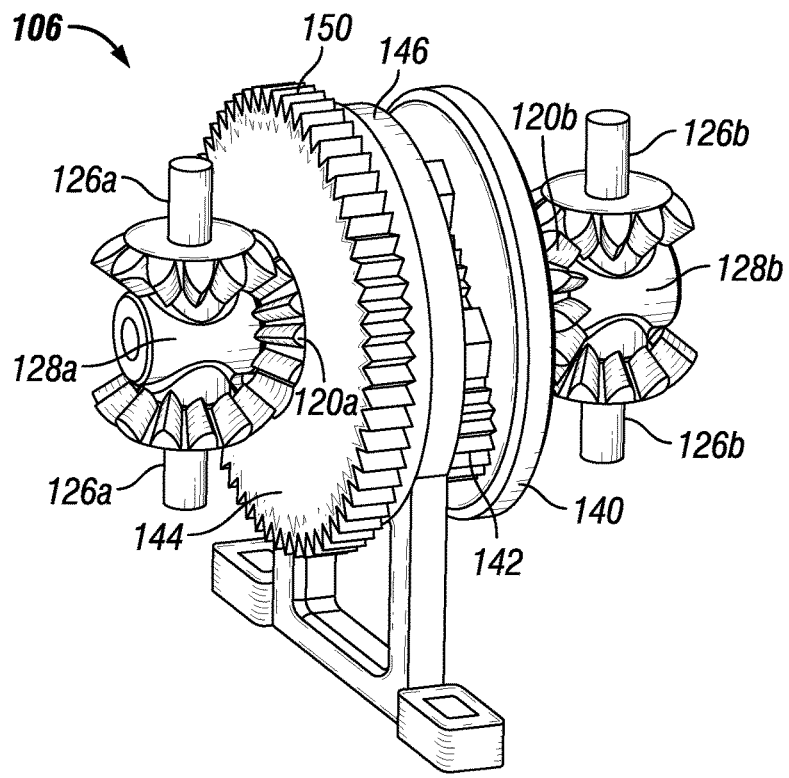
FIG. 10 is close-up perspective view of the reduction gear unit and a portion of the bevel gear sets of the continuously variable transmission of FIG. 1.
Figure 11:
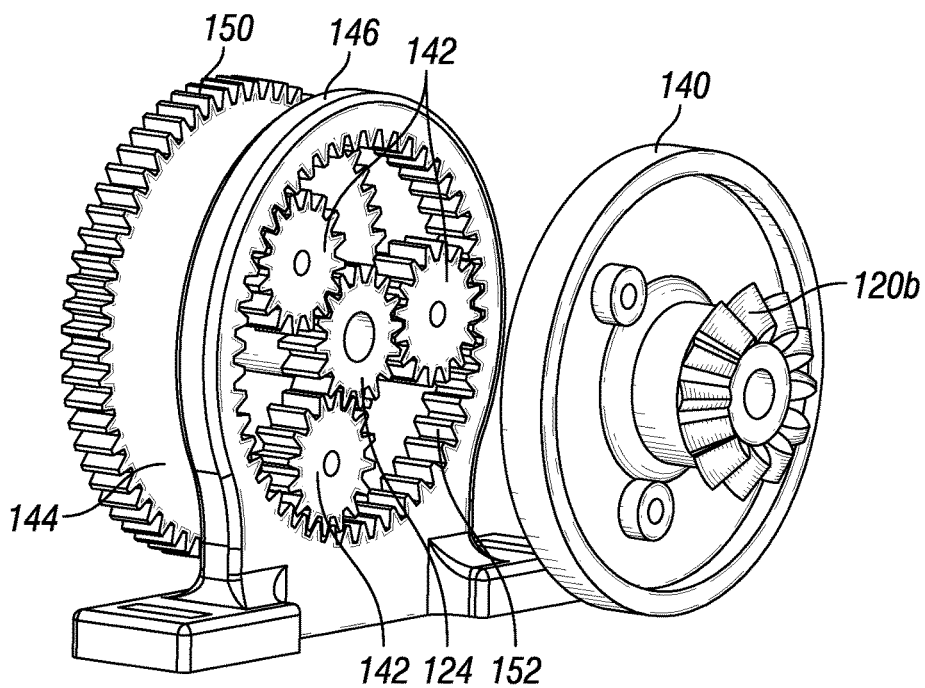
FIG. 11 is a partially disassembled perspective view of an embodiment of a reduction gear unit configured for use with the transmission of FIG. 1, having a 3-gear planetary gear arrangement.
Figure 12:
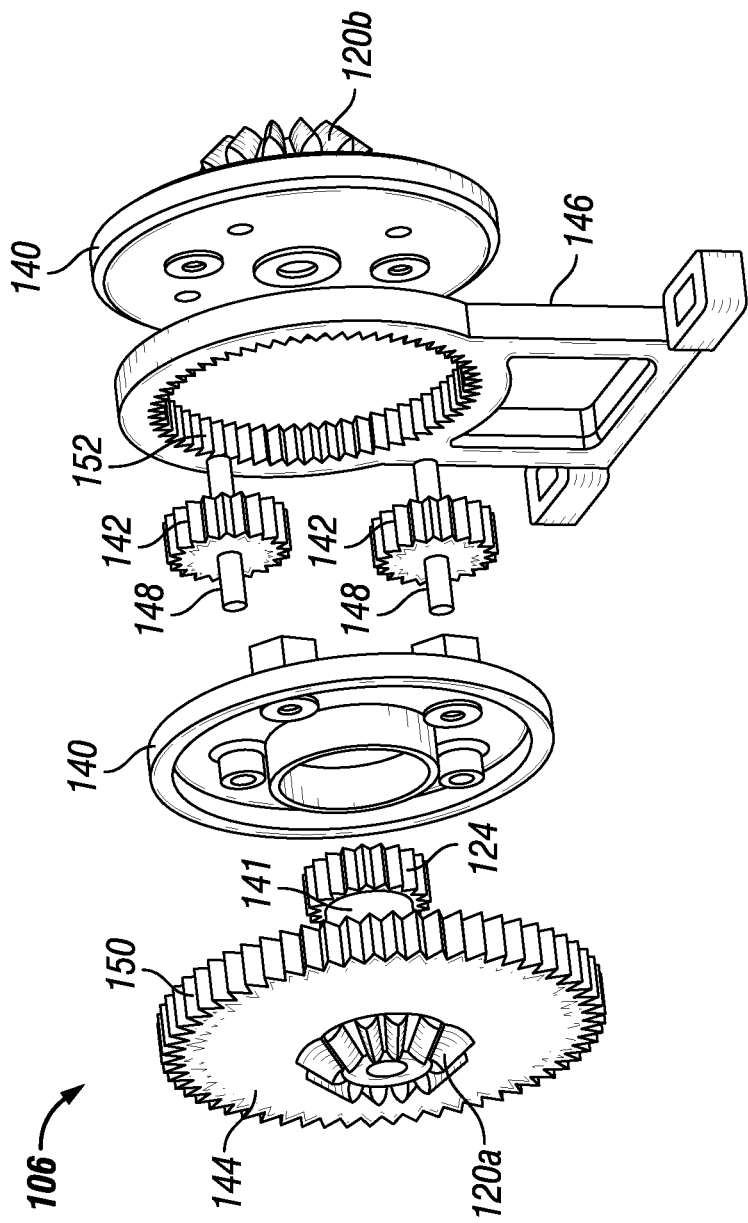
FIG. 12 is an exploded perspective view of an embodiment of a reduction gear unit configured for use with the transmission of FIG. 1, having a 2-gear planetary gear arrangement.

Viewing FIGS. 10-12, the reduction gear unit 106 generally includes a sun gear 124, a group of planet gears 142, a planet gear carrier 140, and a ring gear 146 that is fixed in position. In the embodiment of FIG. 12, the carrier 140 includes two portions that are generally disk-shaped and are parallel to each other. The planet gears 142 (and the ring gear 146) are sandwiched between the two portions of the carrier, and the planet gears 142 are supported upon planet gear bearings 148 that are supported by the two portions of the carrier. The second low speed high torque bevel gear 120b extends from and is fixedly attached to the second portion of the carrier 140. In the embodiment of FIGS. 10 and 11, however, the carrier 140 is a single piece that lies on one side of the ring gear 146, and the second low speed high torque bevel gear 120b is attached to this one piece.

The planet gears 142 are intermeshed with the sun gear 124 in the center of the reduction gear unit 106, and are intermeshed with the teeth 152 around the perimeter of the fixed ring gear 146. As is well known, a sun and planet gear system can provide a gear reduction between an input shaft and an output shaft, depending on the gear ratios of the sun and planet gears 124, 142 and the ring gear 146. The ratios of these gears causes the carrier 140 (and thus the second high torque gear 120b) to rotate at a speed that is different than the speed of the first high torque gear 120a.

The first low speed high torque bevel gear 102a and the sun gear 124 are connected by the extension 141, and can be an integral unit. A gear adjustment wheel 144, having gear teeth 150, can also extend from the extension 141, and can be used for adjusting the degree to which the reduction gear 106 operates, as discussed below. As shown in FIG. 4, the bevel gear 102a, sun gear 124 and extension 141 can be rotationally supported upon the high speed shaft 122 by bearing units 154, 156, and the carrier 140 can be rotationally supported upon the shaft extension 141 by a carrier bearing 158. With this configuration, the unit including the first high torque bevel gear 102a, the sun gear 124 and the extension 141 can freely rotate at a different speed than the carrier 140.

Operation of this continuously variable transmission is as follows. When the motor 110 is activated, turning the input shaft 108 in a given direction, this will drive the output shaft 112 in the same direction. The motor 110 is connected to the first asymmetrical differential 102, which divides the torque of the input shaft 108 into two parts. The first differential armature 130a is directly attached to the input shaft 108, and is thus driven by the motor 110. Since the first differential bevel gears 118a are rotationally mounted upon the first armature 130a with axles 126a and center hubs 128a, the rotational axes of these bevel gears 118a rotate with the armature. As this arrangement rotates, the first differential bevel gears 118a will make contact with and drive the high speed/low torque shaft 122 by making contact with the first high speed low torque gear 116a. At the same time, the first differential bevel gears 118a will also make contact with and drive the first low speed/high torque gear 120a, which is connected to drive the sun gear 124 of the reduction gear unit 106.

The intermeshing of the gears 118a with the gears 116a and 120a (which are free to rotate independently of the input shaft 108), will naturally distribute the rotational energy of the armature 130a into the gears 116a and 120a. Since the high speed input gear 116a and low speed input gear 120a rotate independently of each other, the first asymmetrical differential 102 thus divides the torque of the input shaft into two output streams—the high speed shaft 122 and the high torque shaft extension 141.

At this point both the high speed/low torque shaft 122 and the low speed/high torque input gear 120a are driven with equal force. At this point, however, a basic principle of mechanics comes into play. In mechanical systems, where a force is divided between two output streams, the mechanical force will naturally follow the path of least resistance. Because the low speed/high toque input gear 120a is attached to the planetary reduction gear unit 106, which has inherently more resistance due to its gearing, the motor force is naturally biased toward the path of least mechanical resistance, which is the freely spinning high speed/low torque shaft 122. Where the output shaft 112 has no rotational resistance upon it, the very existence of the reduction gear 106 will naturally cause most or all of the torque from the input shaft 108 to flow through the high speed shaft 122 simply because fewer mechanical elements are connected to that shaft. Every element that rotates in the transmission 100 introduces a certain level of resistance simply from inertia and friction. Transmission of rotation through the reduction gear 106 to the output shaft 112 involves the rotation of several more mechanical elements (the sun gear 124, the planet gears 142, the carrier 140), in addition to the different gear ratio, than does transmission of rotation to the output shaft 112 through the high speed shaft 122. Consequently, the inertia of the reduction gear 106 will cause it to remain still when there is no resistance upon the output shaft 112.

In the low resistance situation, the rotational force of the motor 110 thus drives the high speed/low torque shaft 122 and its fixed high speed low torque gears 116a, 116b. The second high speed low torque gear 116b in turn drives the second differential bevel gears 118b, which in turn rotates the armature 130b of the second differential 104, and thus rotates the output shaft 112. With the transmission configuration shown herein, where no resistive load is applied to the output shaft 112, the output shaft will be allowed to run freely, with essentially the same speed as the input shaft 108, but with relatively low torque—i.e. the torque provided by the motor 110 at its running speed, which may itself be geared down prior to entering the transmission 100. In this condition, the output shaft 112 will turn at the same speed (i.e. an effective gear ratio of 1:1) and direction as the high speed/low torque shaft 122 and the high speed low torque gears 116a, b. As long as there is little or no resistive force to the output shaft 112, the low speed/high torque gear 120a will not rotate.

However, as a resistive load is applied to the output shaft 112, the torque and speeds of the components of the transmission 100 will begin to migrate. With a resistive load applied to the output shaft 112, this imposes greater resistance upon the high speed/low torque shaft 122 and the high speed bevel gear 116a. When the mechanical resistance of this gear 116a comes to equal or exceed that of the reduction gear 106, the first high speed gear 116a will begin to slow down, and the low speed/high torque gear 120a will begin to rotate. In this way, rotational force will begin to be transmitted to the first high torque bevel gear 120a, thus turning the reduction gear 106.

Because rotation of the low speed/high torque gear 120a feeds into the planetary reduction gearbox 106, which produces a lower speed, higher torque output, a portion of the rotational force of the input shaft 108 is transmitted through the reduction gear and the second high torque gear 120b, thus providing greater torque (by virtue of the gear ratio of reduction gear unit 106) at a lower speed for driving the output differential 104, and thus the attached output shaft 112, to overcome the load. As the load upon the output shaft 112 continues to increase, the speed will continue to decrease, and the portion of the load borne by the low speed/high torque gear 120b will increase to bear the load, but at a lower speed. Throughout this entire process, it is presumed that the rotational speed of the input shaft 108 remains constant.

The result of this operation is a natural "balancing" or "blending" of torque and rotational speed in order to bear the increased resistive force applied to the output shaft 112. With a constant power input, as the resistive force to the output shaft 112 increases, the output speed will naturally tend to drop, but the output torque will increase. On the other hand, if the load is decreased, with no change in input power, the opposite happens—the output shaft 112 will rotate faster with less torque, as expected. By varying the resistance to the output shaft 112, the continuously variable transmission 100 "balances" or "blends" the combination of speed and torque to match the load applied.

It is notable that the motor 110 does not necessarily change speed or experience a change of output power as this torque/speed balancing or blending occurs. These factors can be held constant, if desired. On the other hand, the speed and power of the motor 110 can be changed at will to obtain a desired output speed for a given torque load. Thus, a constant motor output can be maintained while the torque output and speed are allowed to vary with changes in load, or a constant output speed can be maintained by modifying the motor input power and speed as torque loads change. This can allow motors to be operated in a desired speed and output torque range for maximum efficiency.

Figure 13:
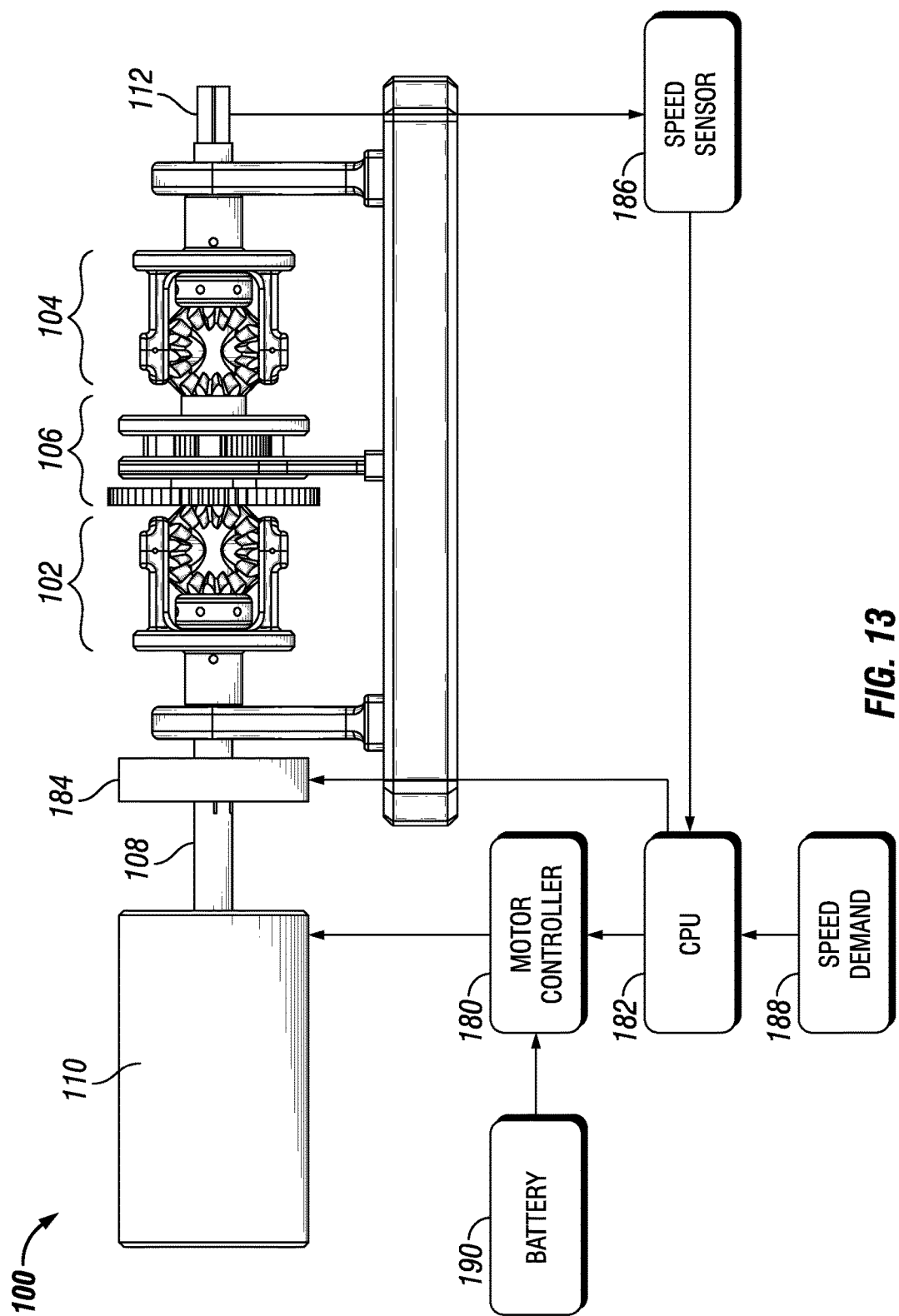
FIG. 13 is a partial schematic side view of the continuously variable transmission of FIG. 1, showing an embodiment of an electronic control system.

Control of this continuously variable transmission 100 can be relatively simple. Shown in FIG. 13 is a partial schematic side view of the continuously variable transmission of FIG. 1, showing an embodiment of an electronic control system for use with this transmission connected to an electric motor 110 that is powered by a battery 190. The control system generally includes a motor controller 180, a CPU 182, and a speed sensor 186 that is connected to the output shaft 112. The CPU receives input from the speed sensor 186 indicating the rotational speed of the output shaft 112, and also receives input from a speed demand system 188, which can include user input devices like a throttle pedal, a cruise control system or a control switch or speed selector device of some sort. The CPU 182 provides commands to the motor controller 180, which selectively controls the power from the battery 190 to the motor 110. This adjusts the rotational speed of the input shaft, which is modulated through the transmission 100 in the manner discussed above. Specifically, the first and second asymmetrical differentials 102, 104 and the reduction gear 106 naturally balance the input power to provide a desired speed of the output shaft 112 for given operating conditions. When conditions change, the motor control settings at any given time will naturally cause the transmission to rebalance, thus changing the speed of the output shaft 112, and causing the CPU 182 to readjust the motor parameters to compensate.

As shown in FIG. 13, the transmission 100 can also include a clutch 184, such as a power-operated clutch, coupled to the input shaft, so that the input shaft 108 can be selectively engaged with the transmission 100. In systems that use an electric motor, as shown in FIG. 13, it may be possible and even desirable to omit the clutch 184. This is possible because with an electric motor, stopping the system can simply be a matter of stopping power to the motor 110. However, in some other systems, such as a vehicle powered by an internal combustion engine, the engine normally idles when the vehicle is stopped. Thus, it is desirable to disconnect the engine shaft from the transmission until is it desired to resume transmitting force through the transmission.

The clutch 184 can also be provided to prevent back drive—that is, reverse rotation being transmitted through the transmission 100 into the input shaft 108. It is to be appreciated that the continuously variable transmission 100 can operate in either rotational direction. If the output shaft 112 is completely stalled or resisted, and the input motor 110 is still driving the input shaft 108 (a condition under which an internal combustion engine would stall and die), the gears of the transmission 100 create a back drive situation, wherein the high speed shaft 122 is driven in a reverse direction. In some applications, a back drive situation can be desirable as an automatic safety feature. In other applications, however, it may be undesirable. Advantageously, the clutch 184 allows disengagement of the transmission 100 from the input shaft 108 to prevent this. This can be done in a configuration in which the clutch 184 is a power-operated clutch, controlled by the CPU 182 based on input from the speed sensor 186. Alternatively, the clutch 184 can be a purely mechanical overrunning clutch, which only allows transmission of rotation in one direction, and thus automatically prevents reverse operation.

As another alternative, back drive can be prevented by providing a clutch elsewhere in the transmission 100. For example, viewing FIGS. 3, 4 and 5A-5B, bearing 134a can be a roller bearing clutch. Advantageously, a one way roller bearing clutch 134a disposed at the proximal end of the high speed shaft 122 can prevent back drive, thus eliminating this potential issue where it could present problems.

While reverse operation may or may not be desirable, the transmission 100 can still transmit torque either from the input shaft 108 to the output shaft 112, or from the output shaft 112 to the input shaft, whether this is done with single direction operation, or bi-directional operation. For example, where the transmission 100 is powered and rotating in its drive direction, and power to the motor 110 is cut, continued rotation of the output shaft 112 (e.g. due to inertia) will tend to transmit torque through the transmission 100 to the output shaft 108, with the asymmetrical differentials 102, 104 and reduction gear 106 naturally balancing the transmission of torque just as it does in normal operation. This feature can be useful in electric vehicles, for example, providing a dynamic braking system that allows the generation of electricity from the inertia of the vehicle, while slowing the vehicle. In a vehicle with an internal combustion engine, this mode of operation can provide the effect of engine braking, which can be useful for large trucks and smaller vehicles descending steep hills.

Advantageously, since this continuously variable transmission 100 uses gears for transmitting torque, rather than friction-based structures that are commonly used in many continuously variable transmissions, it has relatively low mechanical losses, and it is scalable for use with both large and small machines, from small motorized toys to industrial robots, motor vehicles and heavy equipment with high torque motors. Additionally, the simplicity of this transmission makes it economical, durable, and easy to maintain. Since this transmission does not include shifting gear trains, it is considered likely to have a very long life with very little need for maintenance.

Figure 14:
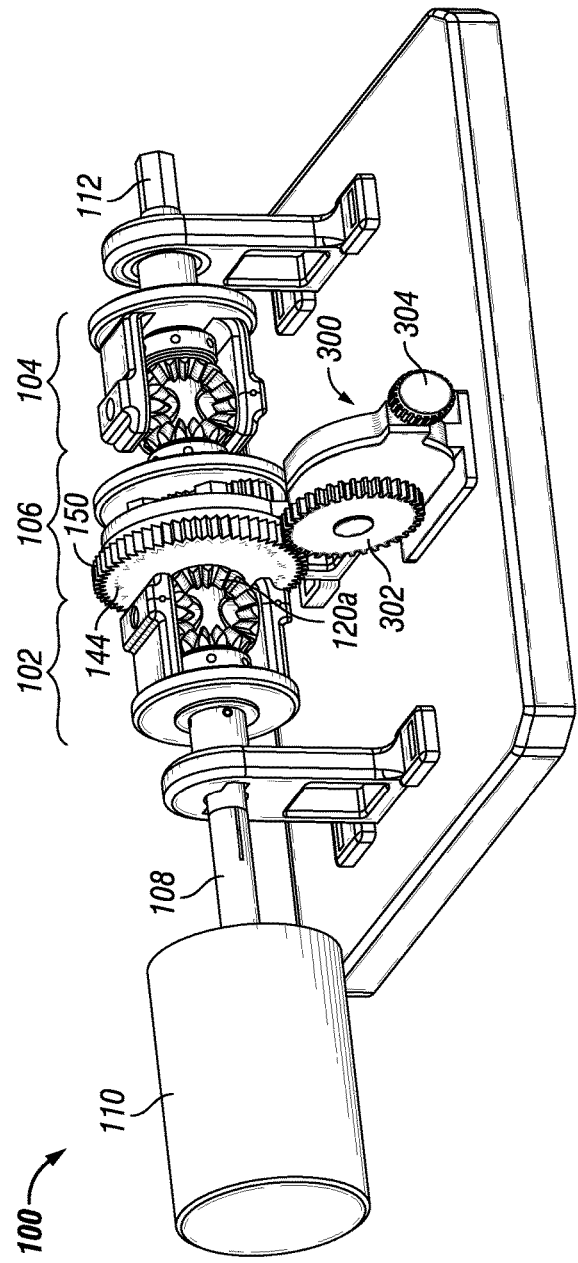
FIG. 14 is a perspective view of another embodiment of a continuously variable transmission in accordance with the present disclosure, having a selective speed and torque adjustment mechanism.

An additional feature of the continuously variable transmission shown herein is illustrated with reference to FIGS. 14-15 and 16-17. Since this transmission naturally balances torque and output speed based on its own internal resistance, a simple mechanism can be added to allow selective balancing of these forces. Shown in FIG. 14 is a perspective view of an embodiment of a continuously variable transmission 100 in accordance with the present disclosure, having a gear range selector device 300. As discussed herein, this transmission includes an output shaft 112, and an input shaft 108, which is attached to a motor 110 that provides power to the transmission. The transmission 100 includes first and second differentials 102, 104, with a reduction gear 106 disposed between them.

Figure 15:
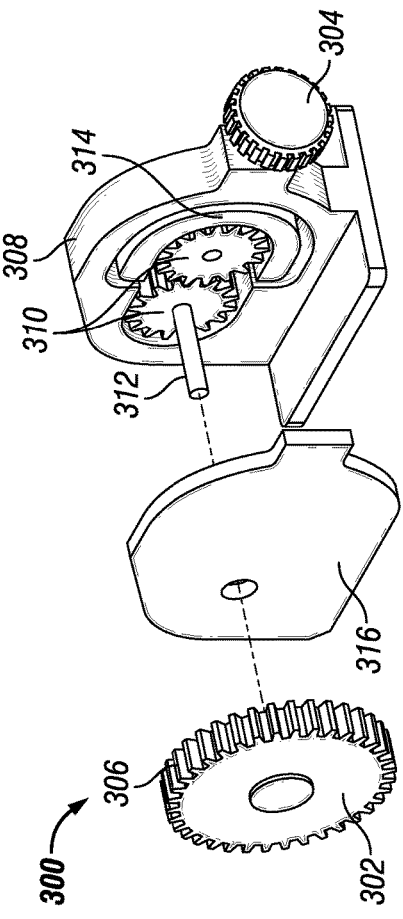
FIG. 15 is an exploded perspective view of the selective speed and torque adjustment mechanism configured for use in with the continuously variable transmission of FIG. 14.

As noted above, the first asymmetrical differential 102 includes a gear adjustment wheel 144, having gear teeth 150, which extends from the extension (141 in FIGS. 4, 5A-5B, 7A-7B) that is connected to the first high torque gear 120a. The teeth 150 of the gear adjustment wheel 144 are intermeshed with a braking gear 302 of a gear range selector device 300. An exploded perspective view of the gear range selector device 300 is shown in FIG. 15. The gear range selector device 300 is a modification of a reciprocating oil gear pump. The device 300 includes a pair of pump gears 310 that are tightly enmeshed and rotate together to circulate a fluid (e.g. oil) within a housing 308. The trapped fluid is recirculated through a channel that passes by an adjuster 304. The first of the two pump gears 310 is mounted on an axle 312 that extends through the housing cover 316 and is affixed to the braking gear 302.

Manipulation of the adjuster 304 can vary a resistance to the flow of the fluid within the housing 308, and thereby resist rotation of the braking gear 302. The same principal of fluid dampening is used in adjustable oil shocks. One advantage of this gear range selector device 300 is that it does not impose wear on friction plates or the like in order to produce a speed reduction. The adjuster 304 allows variation in the degree of resistance applied to flow of the fluid, and thus allows variation in the degree of braking applied by the gear range selector device 300. While the adjuster 304 is shown configured as a knob for manual twisting, it is to be appreciated that other devices can be used, such as a servo motor under the control of a computer controller (e.g. CPU 182 in FIG. 13).

In operation, the gear teeth 306 of the braking gear 302 are engaged with the teeth 150 of the gear adjustment wheel 144. With no resistance applied to the braking gear 302, the transmission will operate in the ordinary load balancing mode, as discussed above. However, when the adjuster 304 is rotated to apply resistance to the adjustment gears 310, this applies a braking force from the braking gear 302 to the gear adjustment wheel 144, and thus to the input of the reduction gear unit 106. This additional resistance applied to the reduction gear 106 naturally reduces the relative proportion of torque distributed through the reduction gear 106, and thus naturally distributes more torque through the high speed shaft 122, in the manner discussed above. Accordingly, with some level of resistance applied by the gear range selector 300, the transmission will provide a higher speed at the output shaft 112, but with lower torque. If the gear range selector device 300 is adjusted to completely stop rotation of the gear adjustment wheel 144, this will completely stop the reduction gear 106, and will thus distribute all rotation through the high speed shaft 122.

The gear range selector device 300 thus allows adjustment of the degree to which the reduction gear 106 operates. No resistance from the gear range selector 300 allows standard operation, with resistance on the output shaft 112 naturally causing the transmission to gear down for greater torque, but at a reduced speed (unless the output of the motor 110 is adjusted). This can be desirable for bearing heavy loads while maintaining a desired level of efficiency, and without adjusting the operational parameters of the motor 110. On the other hand, higher resistance on the gear range selector 300 allows the transmission to provide higher speed, though the torque on the output shaft 112 will be limited to the torque provided by the input shaft 108. This can be desirable for conditions where high speed is desired and loads are small, or where high speed is desired and any additional torque that is needed is provided by adjusting the operational parameters of the motor 110.

It is to be appreciated that application of braking force on the gear adjustment wheel 144 does not impose significant mechanical losses (e.g. parasitic losses) upon the transmission because it is not providing an overall braking force upon the transmission 100. Instead, a braking force upon the gear adjustment wheel 144 merely redistributes rotational motion to other parts of the transmission 100 (e.g. to the high speed shaft 122), which are always free to rotate. Thus, there is little or no parasitic loss from use of the gear range selector device 300.

Figure 16:
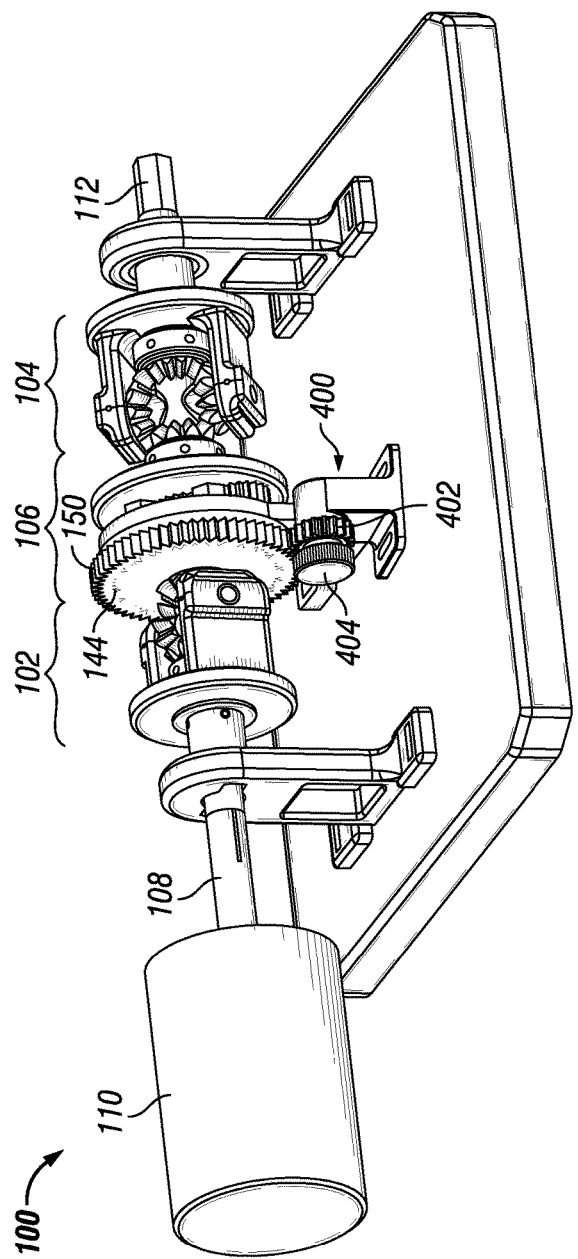
FIG. 16 is a perspective view of another embodiment of a continuously variable transmission in accordance with the present disclosure, having a selective speed and torque adjustment mechanism.
Figure 17:
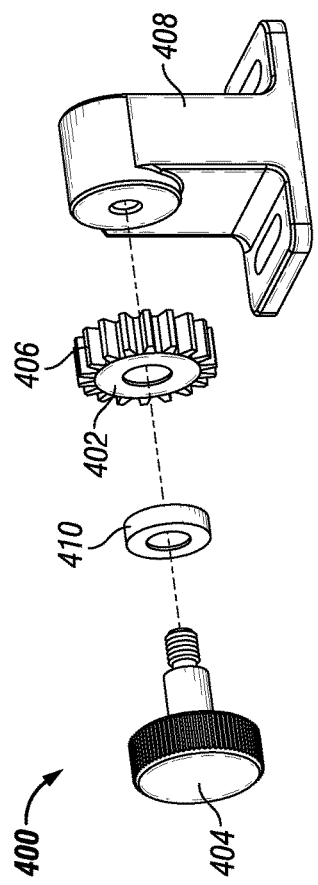
FIG. 17 is an exploded perspective view of the selective speed and torque adjustment mechanism configured for use in with the continuously variable transmission of FIG. 13.

Another embodiment of a continuously variable transmission 100 having a gear range selector device 400 is shown in FIG. 16, and an exploded perspective view of the gear range selector device 400 is shown in FIG. 17. Again, the transmission 100 includes an output shaft 112, and an input shaft 108 that is attached to a motor 110, with first and second differentials 102, 104, and a reduction gear 106 disposed between them. In this embodiment, the teeth 150 of the gear adjustment wheel 144 are intermeshed with a braking gear 402 of a gear range selector device 400, which, as shown in FIG. 17. The gear range selector device 400 includes a base 408, the braking wheel 402 with gear teeth 406, a brake ring 410, and an adjuster 404. The adjuster 404 is shown configured as a knob for manual twisting, but it is to be appreciated that other adjuster devices can be used, such as a servo motor under the control of a computer controller (e.g. CPU 482 in FIG. 18).

In operation, the gear teeth 406 of the braking gear 402 are engaged with the teeth 150 of the gear adjustment wheel 144. With no resistance applied to the braking gear 402, the transmission will operate in the ordinary load-balancing mode discussed above. However, when the adjuster 404 is rotated to apply resistance to the braking gear 402 via the brake ring 410, this applied resistance to the gear adjustment wheel 144, and thus redistributes torque between the reduction gear 106 and the high speed shaft 122, in the manner discussed above.

Figure 18:
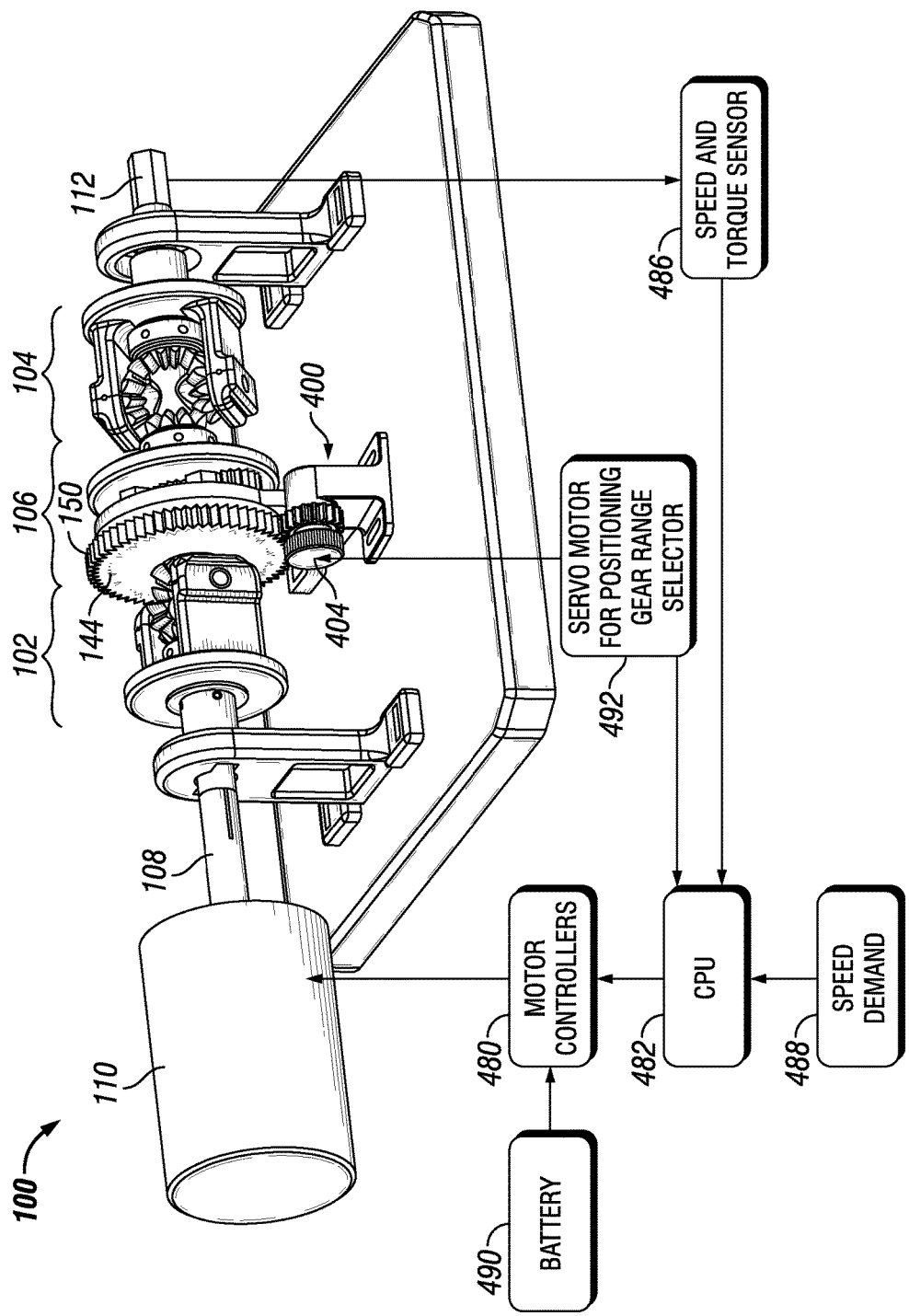
FIG. 18 is a partial schematic perspective view of a continuously variable transmission like that of FIG. 13, showing an embodiment of an electronic control system.

A configuration of a computerized control system for a transmission 100 having a gear range selector device 400 is illustrated in the partial schematic perspective view of FIG. 18. This control system is similar to that of FIG. 13. In FIG. 18 the transmission 100 is connected to an electric motor 110 that is powered by a battery 490. The control system generally includes a motor controller 480, a CPU 482, and a speed sensor 486 that is connected to the output shaft 112. The CPU 482 receives input from the speed sensor 486 indicating the rotational speed of the output shaft 112, and also receives input from a speed demand system 488, which can include user input devices like a throttle pedal, a cruise control system or a control switch or speed selector device of some sort. The CPU 482 provides commands to the motor controller 480, which selectively controls the power from the battery 490 to the motor 110. This adjusts the rotational speed of the input shaft 108, which is modulated through the transmission 100 in the manner discussed above. Though not shown in FIG. 18, a clutch can also be provided on the input shaft 108 and controlled via the CPU 482.

As discussed above, when operating conditions change, settings of the motor controller 480 can change under command of the CPU 482 at any given time in order to cause the transmission 100 to rebalance, thus changing the speed and/or power of the output shaft 112. Advantageously, this control system also includes a servo motor 492, which is coupled to the adjuster 404 of the gear range selector 400. Thus, when a signal is received by the CPU 482 indicating a need to increase the speed of the output shaft 112 without increasing (or increasing only to some limited degree) the speed of the input shaft 108, the CPU can send a signal to the servo motor 492, causing it to impose some degree of resistance to the gear adjustment wheel 144, as needed. The gear range selector device 400, as controlled by the CPU 482 and subject to input from a user through the speed demand device 488 and the speed and torque sensor 486, thus allows adjustment of the degree to which the reduction gear 106 operates, allowing the gear ratio of the transmission 100 to be selected if desired.

The present disclosure thus provides a continuously variable transmission that passively senses and balances loads, allowing high efficiency. It automatically balances output speed and torque depending on its input and the load upon the output shaft, and does so smoothly and imperceptibly, without abrupt shifting between different gear sets and without the need for a transmission that is heavy, highly complicated, and subject to significant maintenance and wear. Its mode of operation can also be selectable, so that a user can obtain a desired speed by adjusting the load-balancing characteristics of the transmission.

The continuously variable transmission disclosed herein can be used in a wide variety of applications, such as automobiles and other vehicles, in cranes, winches and hoists, heavy equipment, robots and other applications. This transmission can be used in some current applications to take the place of multiple motors. For example, in some applications, such as robotics, different lifting and moving conditions are common. For example, a single robot may be configured to move large loads, and also to move without any load. The designer of such a robot may be faced with providing one vary large motor for both applications, in which case the robot may move very slowly and inefficiently when under no load, or providing two motors for the different conditions, which is more costly for producing the machine. With the present transmission system, in contrast, a single motor can move a mechanical device quickly when no load is applied, and automatically slow its speed to bear a heavy load when required. The size of the motor can thus be optimized, and the use of multiple motors reduced.

Although various embodiments have been shown and described, the present disclosure is not so limited and will be understood to include all such modifications and variations are would be apparent to one skilled in the art.

What is claimed is:

1. A continuously variable transmission, comprising:
    a first asymmetrical differential, having a transmission input shaft and a first output shaft, aligned along a transmission axis;
    a second asymmetrical differential, having a transmission output shaft and a first input shaft, aligned along the transmission axis; and
    a reduction gear unit, coupled between the first output shaft of the first asymmetrical differential and the first input shaft of the second asymmetrical differential, rotation of the transmission input shaft at a first input speed and torque being converted into rotation of the transmission output shaft at a second output speed and torque that varies independently of the first input speed and torque in response to a rotational resistance on the transmission output shaft.

2. The continuously variable transmission of claim 1, wherein the reduction gear unit has a gear ratio in the range of 1,000:1 to 1:1,000.

3. The continuously variable transmission of claim 1, wherein the reduction gear unit further comprises:
    a sun gear, fixedly coupled to the first output shaft;
    a fixed ring gear, encircling the sun gear;
    a plurality of planet gears, coupled between the sun gear and the ring gear; and
    a carrier, fixedly coupled to the first input shaft, supporting a bearing shaft for each of the planet gears.

4. The continuously variable transmission of claim 1, further comprising a clutch, disposed upon the transmission input shaft, configured to allow selective engagement of the transmission input shaft with a drive shaft.

5. The continuously variable transmission of claim 1, further comprising an overrunning clutch, disposed upon the transmission input shaft, configured to allow rotation of the transmission input shaft in one direction only.

6. The continuously variable transmission of claim 1, further comprising:
    a speed sensor, coupled to the transmission output shaft; and
    a controller, coupled to receive input from the speed sensor and from a user, and to provide control output suitable for a motor that can be coupled to the transmission input shaft, based on the motor control inputs and the speed of the transmission output shaft.

7. The continuously variable transmission of claim 6, further comprising a gear range selector, operatively coupled to the controller and engaged with the reduction gear unit, configured to selectively inhibit rotation of the reduction gear unit in response to signals from the controller, and thereby modify the rotational speed and torque of the transmission output shaft.

8. The continuously variable transmission of claim 1, further comprising a gear range selector, engaged with the reduction gear unit and configured to selectively inhibit rotation of the reduction gear unit and thereby modify the rotational speed and torque of the transmission output shaft.

9. The continuously variable transmission of claim 1, further comprising:
    an independently rotatable high speed shaft, extending through the reduction gear unit from the first asymmetrical differential to the second asymmetrical differential and coaxially passing through the first output shaft and the first input shaft;
    a first low torque bevel gear, disposed at a first end of the high speed shaft and comprising a part of the first asymmetrical differential; and
    a second low torque bevel gear, disposed at a second end of the high speed shaft and comprising a part of the second asymmetrical differential, a degree of torque transmitted via the high speed shaft through the transmission to the transmission output shaft being inversely proportional to a magnitude of rotation of the reduction gear unit.

10. The continuously variable transmission of claim 1, further comprising a one-way clutch, coupled to the high speed shaft, configured to prevent transmission of reverse rotation from the high speed shaft to the transmission input shaft.

11. The continuously variable transmission of claim 1, further comprising a housing, surrounding and containing the first and second asymmetrical differentials and the reduction gear unit.

12. A continuously variable transmission, comprising:
    a first asymmetrical differential, having a transmission input shaft configured for connection to a drive shaft of a motor, an outer output shaft, and an inner output shaft, the outer output shaft and the inner output shaft being coaxial, wherein the transmission input shaft, the outer output shaft, and the inner output shaft are and disposed along a common transmission axis;
    a second asymmetrical differential, having a transmission output shaft, an outer input shaft, and an inner input shaft, the outer input shaft and the inner input shaft being coaxial, wherein the transmission output shaft, the outer input shaft, and the inner input shaft are disposed along the transmission axis, and the inner input shaft being an extension of the inner output shaft; and
    a reduction gear unit, having a gear ratio, disposed between the first and second asymmetrical differentials, having a reduction gear input coupled to the outer output shaft, and a reduction gear output coupled to the outer input shaft, whereby rotation of the transmission input shaft of the first asymmetrical differential at a first input speed and torque is converted into rotation of the transmission output shaft at a second output speed and torque that varies independently of the first input speed and torque in direct response to rotational resistance on the transmission output shaft.

13. The continuously variable transmission of claim 12, further comprising a clutch, configured to allow at least one of (i) selective engagement of the transmission input shaft of the continuously variable transmission with the drive shaft and (ii) rotation of the transmission input shaft in one direction only, independent of a rotational direction of the transmission output shaft.

14. The continuously variable transmission of claim 12, further comprising:
a speed sensor, coupled to the transmission output shaft; and
a controller, coupled to receive input from the speed sensor and from a user, and to provide control output suitable for a motor that can be coupled to the transmission input shaft, based on the motor control inputs and the speed of the transmission output shaft.

15. The continuously variable transmission of claim 12, further comprising a gear range selector, operatively coupled to the controller and engaged with the reduction gear unit, configured to selectively inhibit rotation of the reduction gear unit in response to signals from the controller, and thereby modify the rotational speed and torque of the transmission output shaft.

16. A continuously variable drive system, comprising:
a motor, having a drive shaft;
a transmission output shaft, disposed along a transmission axis;
a first asymmetrical differential, having, along the transmission axis, a transmission input shaft coupled to the drive shaft, and first and second coaxial output shafts;
a reduction gear, having an input coupled to the first output shaft of the first asymmetrical differential, and an output; and
a second asymmetrical differential, having, along the transmission axis, a first input shaft coupled to the output of the reduction gear, and second input shaft coupled to the second output shaft of the first asymmetrical differential, a speed and torque of the transmission output shaft varying independently of a speed and torque of the drive shaft in direct response to rotational resistance on the transmission output shaft.

17. The continuously variable drive system of claim 16, further comprising a clutch, coupled between the drive shaft and the transmission input shaft of the first asymmetrical differential.

18. The continuously variable drive system of claim 16, further comprising
a speed sensor, coupled to detect a speed of the transmission output shaft;
an operator input device, configured to receive motor control inputs from a user; and
a controller, coupled to receive input from the speed sensor and from the operator input device, and to provide control output to the motor, based on the motor control inputs and the speed of the transmission output shaft.

19. The continuously variable drive system of claim 18, further comprising a gear range selector, operatively coupled to the controller and engaged with the reduction gear, configured to selectively inhibit rotation of the reduction gear in response to signals from the controller, and thereby modify the rotational speed and torque of the transmission output shaft.

20. The continuously variable drive system of claim 16, wherein the reduction gear comprises a planetary reduction gear system.

21. The continuously variable transmission of claim 9, wherein the first output shaft includes a bevel gear and the transmission input shaft includes an armature having a first pair of differential bevel gears that each intermesh with the first low torque bevel gear on the high speed shaft and the bevel gear of the first output shaft.

22. The continuously variable transmission of claim 10, wherein the first input shaft includes a bevel gear and the transmission output shaft includes an armature having a second pair of differential bevel gears that each intermesh with the second low torque bevel gear on the high speed shaft and the bevel gear of the first input shaft.

23. The continuously variable transmission of claim 11, wherein the reduction gear unit further comprises:
a sun gear, fixedly coupled to the first output shaft;
a fixed ring gear, encircling the sun gear;
a plurality of planet gears, coupled between the sun gear and the ring gear; and
a carrier, fixedly coupled to the first input shaft, supporting a bearing shaft for each of the planet gears.

* * * * *